(12) United States Patent
Nakajima

(10) Patent No.: US 7,038,422 B2
(45) Date of Patent: May 2, 2006

(54) ELECTRICAL ACTUATOR SYSTEM AND VEHICLE AIR CONDITIONER USING THE SAME

(75) Inventor: Hiroshi Nakajima, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/016,517

(22) Filed: Dec. 17, 2004

(65) Prior Publication Data

US 2005/0134210 A1 Jun. 23, 2005

(30) Foreign Application Priority Data

Dec. 19, 2003 (JP) ............................. 2003-422063

(51) Int. Cl.
*G05B 1/06* (2006.01)
*G05B 11/28* (2006.01)
*G05D 3/00* (2006.01)

(52) U.S. Cl. ....................... 318/652; 318/599; 318/466

(58) Field of Classification Search ..................... None
See application file for complete search history.

(56) References Cited

U.S. PATENT DOCUMENTS

| 6,418,274 | B1* | 7/2002 | Tanaka ........................ 388/800 |
| 6,501,239 | B1* | 12/2002 | Ito et al. ........................ 318/34 |
| 6,794,840 | B1* | 9/2004 | Muroi et al. ................. 318/466 |
| 6,801,007 | B1* | 10/2004 | Takeuchi et al. ............ 318/479 |
| 6,809,489 | B1* | 10/2004 | Yoshida et al. ............. 318/560 |
| 6,917,178 | B1* | 7/2005 | Takeuchi et al. ............ 318/625 |
| 6,967,729 | B1* | 11/2005 | Iwamura ..................... 358/1.12 |
| 2003/0184248 | A1* | 10/2003 | Muroi et al. ................. 318/466 |
| 2004/0004457 | A1* | 1/2004 | Takeuchi et al. ............ 318/638 |
| 2004/0124797 | A1 | 7/2004 | Takeuchi et al. |
| 2005/0012480 | A1* | 1/2005 | Takeuchi et al. ............ 318/265 |
| 2005/0077858 | A1* | 4/2005 | Kuribayashi et al. ....... 318/625 |

FOREIGN PATENT DOCUMENTS

| JP | 2000-161639 | 6/2000 |
| JP | 2002-354885 | 12/2002 |

\* cited by examiner

*Primary Examiner*—Marlon T. Fletcher
*Assistant Examiner*—Patrick Miller
(74) *Attorney, Agent, or Firm*—Harness, Dickey & Pierce, PLC

(57) ABSTRACT

In a vehicle air conditioner with an electrical actuator system, a transmission mechanism transmits a rotation force of an electrical motor to an air mixing door when first and second pulse signals are generated from first and second brushes in a door operation region of a pattern plate. In contrast, the transmission mechanism stops the transmission of the rotation force to the air mixing door, when the first and second pulse signals are generated in the first and second brushes in an initialization region. Therefore, in the initialization region, the detection position of the air mixing door is the same regardless of a rotation direction of the electrical motor. As a result, even when the initialization region is arranged at a middle position in the door operation region, the rotation position of the air mixing door can be accurately detected.

11 Claims, 14 Drawing Sheets

FIG. 18

| PULSE | 1 | 2 | 3 | 4 | 4 | 5 | 6 | 7 | 8 | 9 |
|---|---|---|---|---|---|---|---|---|---|---|
| A-PHASE | L | H | H | L | L | H | L | L | H | H |
| B-PHASE | H | H | L | L | H | H | L | H | H | L |
| COUNT | 1 | 2 | 3 | 4 | | 5 | 6 | 7 | 8 | 9 |
| DIRECTION | | | | | NORMAL (→) | | | | | |
| COUNT | 1 | 2 | 3 | 4 | 4 | 5 | 6 | 7 | | |
| DIRECTION | | | | | REVERSE (←) | | | | | |

{ DOOR OPERATION REGION } { INITIALIZATION REGION } { DOOR OPERATION REGION }

FIG. 19

| PULSE | 1 | 2 | 3 | 4 | 5 | 6 | 7 | 8 |
|---|---|---|---|---|---|---|---|---|
| A-PHASE | L | H | H | H | L | L | H | H |
| B-PHASE | H | H | L | H | L | H | H | L |
| COUNT | 1 | 2 | 3 | 4 | 5 | 6 | 7 | |
| DIRECTION | | | | NORMAL (→) | | | | |
| COUNT | 1 | 2 | 3 | 4 | 5 | 6 | 7 | |
| DIRECTION | | | | REVERSE (←) | | | | |

{ DOOR OPERATION REGION } { INITIALIZATION REGION } { DOOR OPERATION REGION }

ELECTRICAL ACTUATOR SYSTEM AND VEHICLE AIR CONDITIONER USING THE SAME

CROSS REFERENCE TO RELATED APPLICATION

This application is based on Japanese Patent Application No. 2003-422063 filed on Dec. 19, 2003, the disclosure of which is incorporated herein by reference.

FIELD OF THE INVENTION

The present invention relates to an electrical actuator system for controlling operation of a movable member by using an electrical motor, and a vehicle air conditioner with the electrical actuator system.

BACKGROUND OF THE INVENTION

A conventional vehicle air conditioner includes an air mixing door for adjusting a temperature of air to be blown into a passenger compartment, a servomotor for rotating the air mixing door, and an electronic control unit for controlling an open degree of the air mixing door by controlling the servomotor of an electrical actuator. For example, the electronic control unit detects a rotation angle and a rotation direction of the air mixing door, and controls the servomotor based on the detected rotation angle and the rotation direction, so that the air mixing door is rotated to a target rotation angle. The electronic control unit detects the rotation angle by counting amplitude variation of first and second pulse signals of the electrical actuator in a door operation region.

However, when an initialization region is simply provided outside the door operation region of the electrical actuator, the side of a rotation member of the electrical actuator becomes larger. In contrast, when the initialization region is provided within the door operation region, it is difficult to accurately detect the rotation angle of the air mixing door.

SUMMARY OF THE INVENTION

In view of the above-described problems, it is an object of the present invention to provide an electrical actuator system which can prevent a detection accuracy of a moving position of a movable member from deteriorating even when an initialization region is provided at a middle position in an operation region.

It is another object of the present invention to provide a vehicle air conditioner in which temperature of air to be blown can be accurately adjusted.

According to an aspect of the present invention, an electrical actuator system includes an electrical motor, a movable member supported to be movable, a transmission mechanism which transmits a rotational force of the electrical motor to the movable member, a rotation member which rotates in accordance with rotation of the electrical motor, and a pulse generator for generating first and second pulse signals in accordance with rotation of the rotation member. The pulse generator generates the first and second pulse signals by a first pulse pattern in an operation region of the rotation member and by a second pulse pattern different from the first pulse pattern in an initialization region of the rotation member, and the initialization region is provided in the rotation member to be offset from the operation region in a circumferential direction and to be arranged at a middle position of the operation region. In the electrical actuator system, a moving position detector detects a position of the movable member based on the first and second pulse signals generated from the pulse generator in the operation region, an initial position detector detects a start point of the movable member based on the first and second pulse signals generated from the pulse generator in the initialization region, and a controller controls the electrical motor to displace the movable member to a target position, based on the position detected by the moving position detector with respect to the start point detected by the initial position detector. Furthermore, when the pulse generator generates the first and second pulse signals in the operation region, the transmission mechanism transmits the rotation force of the electrical motor to the movable member. In contrast, when the pulse generator generates the first and second pulse signals in the initialization region, the transmission mechanism stops the transmission of the rotation force of the electrical motor to the movable member.

Accordingly, when the first and second pulse signals are generated from the pulse generator in the initialization region, the same position is detected as the detection position of the movable member regardless of the rotation direction of the electrical motor. Thus, even when the initial region is arranged at a middle position in the operation region, the position of the movable member can be accurately detected.

Preferably, the transmission mechanism includes an arm member rotating with the rotation of the electrical motor, and a plate member supported to be rotatable. The plate member has a groove in which a protrusion portion of the arm member is inserted to be slidable in accordance with rotation of the arm member, and the movable member rotates integrally with rotation of the plate member. In this case, when the pulse generator generates the first and second pulse signals in the operation region, the protrusion portion press-contacts a side wall portion defining the groove while the protrusion portion slides in the groove, so as to transmit the rotation force of the electrical motor to the plate member. In contrast, when the pulse generator generates the first and second pulse signals in the initialization region, the protrusion portion slides in the groove to have a clearance with the side wall portion of the groove while the protrusion portion slides in the groove, so as to stop transmission of the rotation force of the electrical motor to the plate member.

For example, the groove has a first, second and third groove parts provided continuously, the second groove part is positioned between the first and third groove parts, the protrusion portion press-contacts the side wall portion of the groove in the first and third groove parts, and the protrusion portion slides in the second groove part without press-contacting the side wall portion of the groove. In this case, each of the first, second and third groove parts can be formed approximately in a C shape. Furthermore, the second groove part can have a circular arc shape having the same radius around a rotation axis of the arm member.

Generally, in the first pulse pattern, the first and second pulse signals generate amplitude variation only at one side pulse signal alternatively in the first and second pulse signals, and the moving position detector counts the amplitude variation generated only at one side pulse signal alternatively in the first and second pulse signals. By contrast, in the second pulse pattern, the amplitudes of the first and second pulse signals generated from the pulse generator in the initialization region change in the same direction at the same time, and the initial position detector detects the start point of the movable member by detecting an amplitude change generated at the same time in the first and second pulse signals.

More preferably, the initial position detector detects the start point of the movable member by detecting two times or more the amplitude change generated at the same time in the first and second pulse signals. In this case, the initialization pattern can be more accurately detected.

For example, the movable member is a door member for adjusting an air conditioning state of a vehicle compartment in accordance with a displacement position of the door member.

According to another aspect of the present invention, a vehicle air conditioner includes an air conditioning case for defining an air passage through which air flows toward a passenger compartment of the vehicle, a heat exchanger disposed in the air conditioning case at one side to form a bypass passage through which air flows while bypassing the heat exchanger, a temperature adjustment door which adjusts temperature of air to be blown into the passenger compartment by adjusting a flow ratio between an air amount passing through the heat exchanger and an air amount passing through the bypass passage in accordance with a door opening degree, an electrical motor for moving the temperature adjustment door, a transmission mechanism which transmits a rotational force of the electrical motor to the temperature adjustment door, a rotation member which rotates in accordance with a rotation force of the electrical motor, and a pulse generator for generating first and second pulse signals in accordance with rotation of the rotation member. The pulse generator generates the first and second pulse signals by a first pulse pattern in an operation region of the rotation member and by a second pulse pattern different from the first pulse pattern in an initialization region of the rotation member, and the initialization region is provided in the rotation member to be offset from the operation region in a circumferential direction and to be arranged at a middle position of the operation region. Furthermore, in the vehicle air conditioner, a moving position detector detects a position of the temperature adjustment door based on the first and second pulse signals generated from the pulse generator in the operation region, an initial position detector detects a start point of the movable member based on the first and second pulse signals generated from the pulse generator in the initialization region, a controller controls the electrical motor to displace the temperature adjustment door to a target position based on the position detected by the position detector with respect to the start point detected by the initial detector, and a change restriction means is provided for restricting a variation in the flow ratio relative to the door opening degree when the pulse generator generates the first and second pulse signals in the initialization region. Accordingly, even when the initialization region is provided within the operation region, the temperature of air to be blown into the passenger compartment can be accurately adjusted.

For example, the change restriction means is a shield wall member disposed in the air conditioning case to shield a direct air flow toward the temperature adjustment door when the first and second pulse signals are generated from the pulse generator in the initialization region.

BRIEF DESCRIPTION OF THE DRAWINGS

Other objects, features and advantages of the present invention will become more apparent from the following detailed description made with reference to the accompanying drawings, in which:

FIG. 18 is a schematic diagram showing a pulse pattern of the A-phase and B-phase pulse signals when the initialization region is provided within the door operation region;

FIG. 19 is a schematic diagram showing a pulse pattern of the A-phase and B-phase pulse signals when the initialization region is provided within the door operation region;

DETAILED DESCRIPTION OF THE PREFERRED EMBODIMENTS (First Embodiment)

A first embodiment of the present invention will be now described with reference to FIGS. 1–19. In the first embodiment, an electrical actuator system of the present invention is typically used for an air conditioning unit of a vehicle air conditioner shown in FIG. 1.

Figure 1:
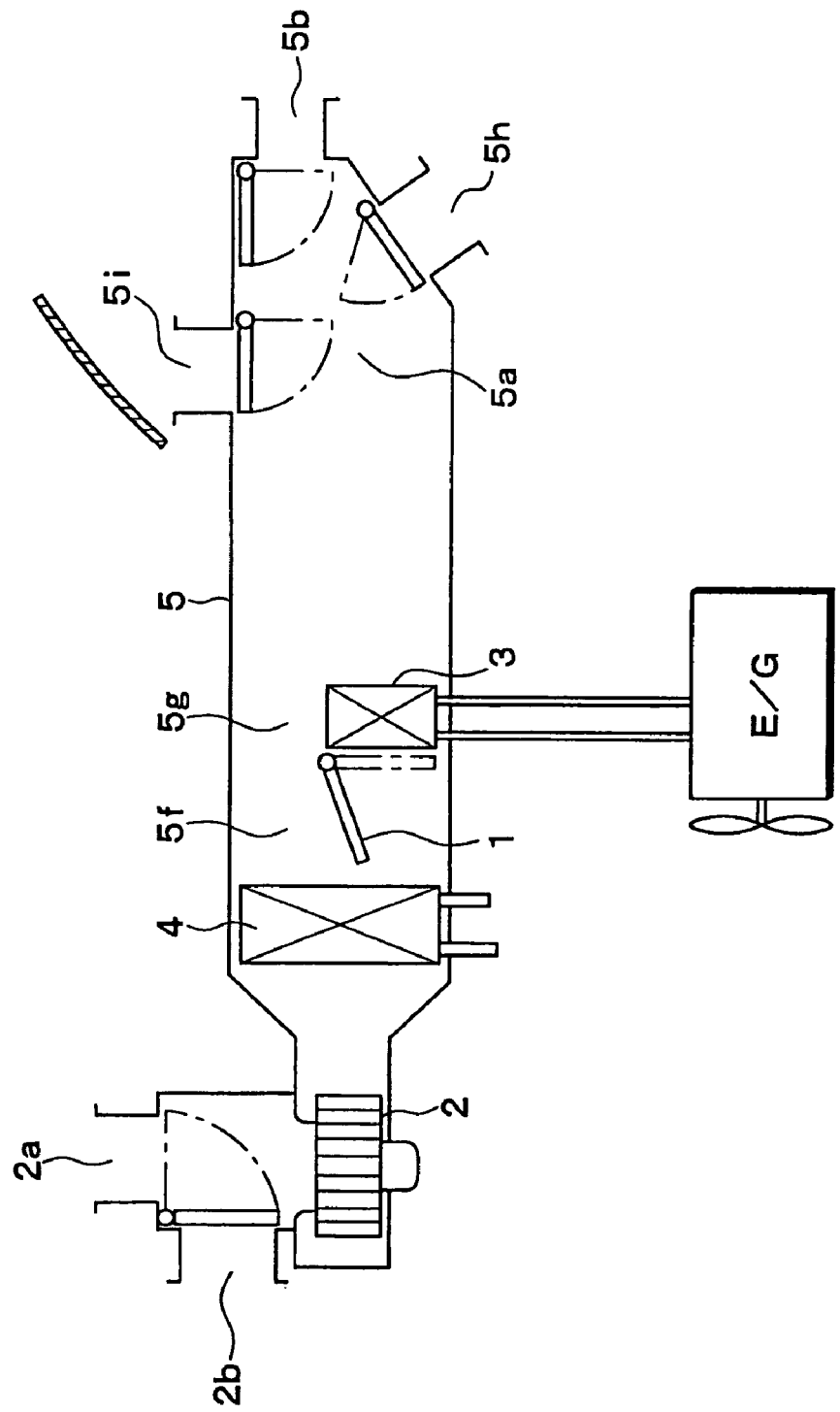
FIG. 1 is a schematic diagram showing a vehicle air conditioner according to a first embodiment of the present invention.

As shown in FIG. 1, the air conditioning unit includes an air conditioning case 5 for forming an air passage 5f through which air flows into a passenger compartment of the vehicle, a blower unit 2 for blowing air, an evaporator 4 (cooling heat exchanger) for cooling air and a heater core 3 (heating heat exchanger) for heating air. The blower unit 2 blows air introduced from at least one of an inside air introducing port 2a and an outside air introducing port 2b into the passenger compartment through the air passage 5f of the air conditioning case 5. The evaporator 4 is disposed in the air conditioning case 5 to cool air blown by the blower unit 2. Generally, a low-pressure refrigerant of a refrigerant cycle flows through the evaporator 4, and is evaporated in the evaporator 4 by absorbing heat from air passing through the evaporator 4. Therefore, air passing through the evaporator 4 is cooled in the air conditioning case 5.

Furthermore, the heater core 3 is disposed in the air conditioning case 5 at a downstream air side of the evaporator 4 to heat air from the evaporator 4. The heater core 3 heats air using engine-cooling water as a heat source. The engine-cooling water (hot water) is circulated to the heater core 3, and is heat-exchanged with air to be blown into the passenger compartment to heat air.

The heater core 3 is disposed in the air conditioning case 5 to form a bypass passage 5g through which air from the evaporator 4 bypasses the heater core 3. An air mixing door 1 is disposed in the air conditioning case 5 to adjust a flow ratio between an air amount flowing through the bypass passage 5g and an air amount flowing through the heater core 3. The air mixing door 1 is driven by an electrical actuator 100 described later, and adjusts temperature of air to be blown into the passenger compartment by adjusting the flow ratio. Air from the bypass passage 5g and air heated in the heater core 3 are mixed in an air mixing chamber 5a so that conditioned air having a predetermined temperature is obtained. The conditioned air in the mixing chamber 5a is blown into the passenger compartment from at least one of a face air outlet 5b, a foot air outlet 5h and a defroster air outlet 5i. Hear, the face air outlet 5b is an outlet for blowing the conditioned air toward the face portion of a passenger in the passenger compartment, the foot air outlet 5h is an outlet for blowing the conditioned air toward the foot portion of the passenger in the passenger compartment, and the defroster air outlet 5i is an outlet for blowing the conditioned air toward an inner surface of a front windshield of the vehicle.

Figure 2:
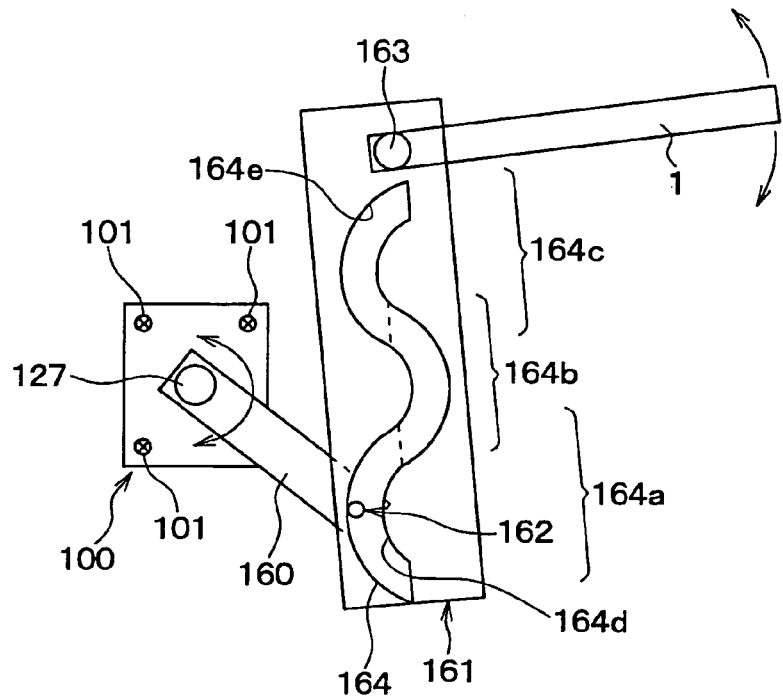
FIG. 2 is a schematic front view showing an electrical actuator according to the first embodiment.
Figure 3:
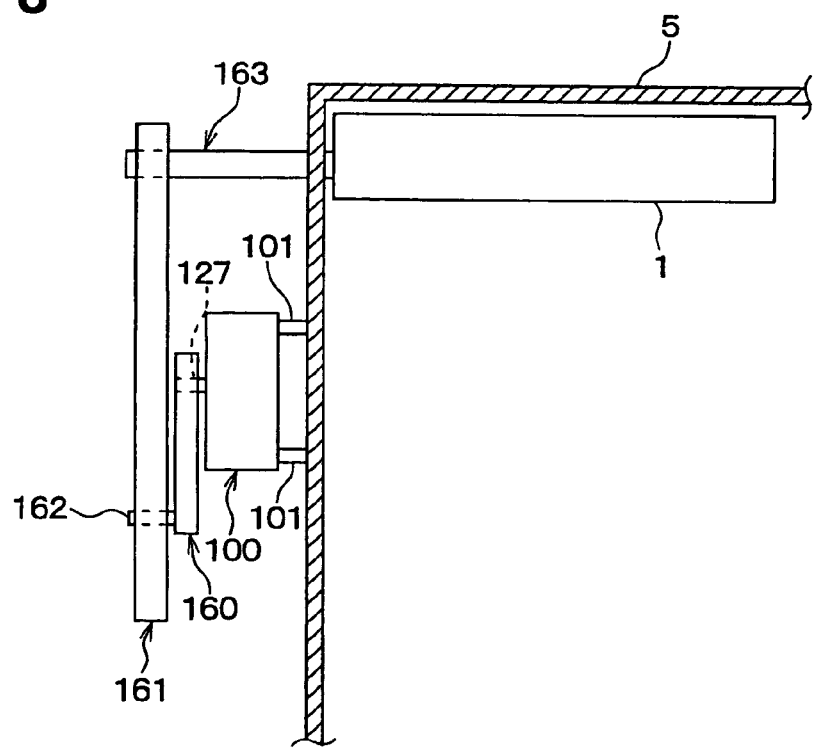
FIG. 3 is a side view showing the electrical actuator according to the first embodiment.

Next, a transmission mechanism for transmitting a driving force of the electrical actuator 100 to the air mixing door 1 will be now described with reference to FIGS. 2 and 3. The transmission mechanism is constructed with an arm member 160 and a link plate 161. The arm member 160 is a rod member, and an output shaft 127 of the actuator 100 is press-fitted to one end side of the arm member 160. The link plate 161 is supported by the air conditioning case 5 to be swung around a door driving shaft 163 described later. The link plate 161 has an insertion groove 164 in which a pin 162 provided at the other end side of the arm member 160 is inserted.

The groove 164 is provided in the link plate 161 for transmitting the driving force of the electrical actuator 100 to the air mixing door 1 and for stopping the transmission of the driving force from the electrical actuator 100 to the air mixing door 1. The groove 164 is constructed with a lower groove part 164a formed approximately in a C shape, a middle groove part 164b formed approximately in a C shape, and an upper groove part 164c formed approximately in a C shape. Here, the middle groove part 164b is formed into a circular arc shape having the same center as the output shaft 127 of the electrical actuator 100.

Furthermore, the door driving shaft 163 penetrates through the air conditioning case 5. One end portion of the door driving shaft 163 is press-fitted to an upper side portion of the link plate 161, and the other end portion of the door driving shaft 163 is press-fitted to one end portion of the air mixing door 1. The electrical actuator 100 is fastened to the air conditioning case 5 through screws 101.

Figure 7:
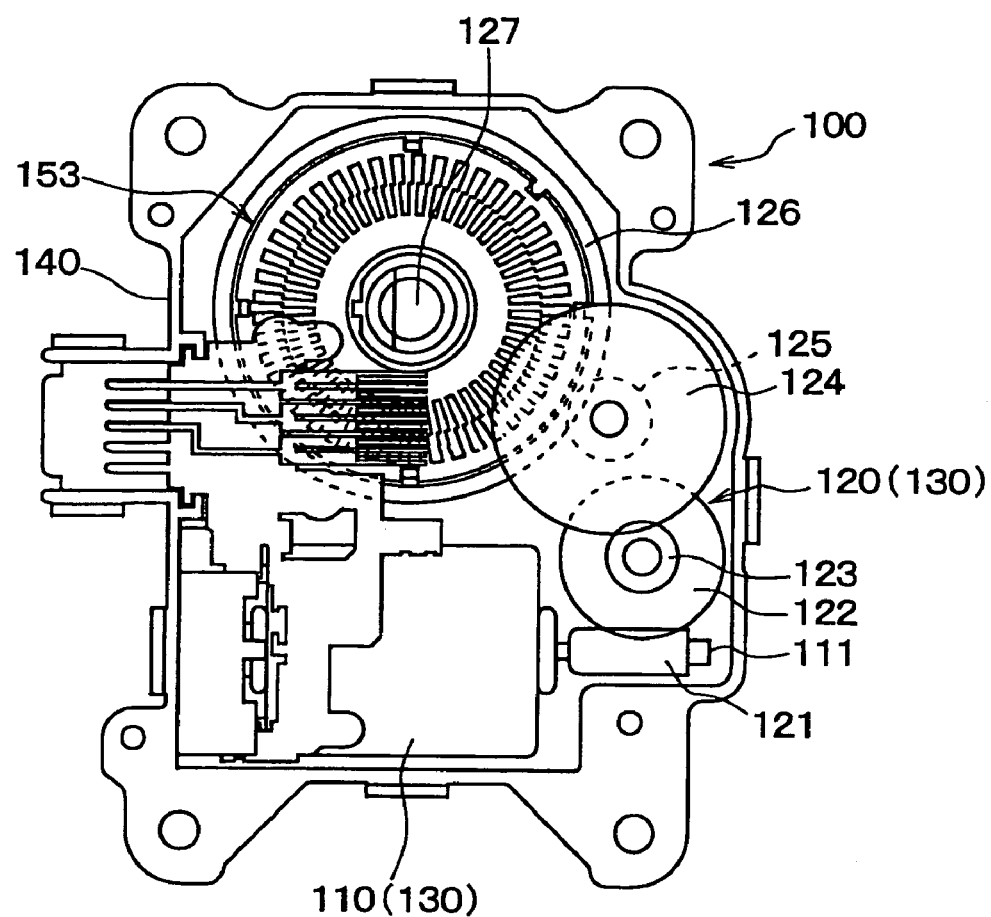
FIG. 7 is a schematic diagram showing a general structure of the electrical actuator.

Next, the structure of the electrical actuator 100 will be now described with reference to FIGS. 4–8. A direct current motor (dc motor) 110 shown in FIG. 7 is rotated by electrical power from a battery mounted on a vehicle, a reduction mechanism 120 shown in FIG. 7 is a change gear mechanism which reduces a rotation force input from the motor 110 and outputs the reduced rotation force to the air mixing door 1. In this embodiment, a driving portion 130 is constructed with the motor 110 and a mechanism portion such as the reduction mechanism 120 for rotating and driving.

The reduction mechanism 120 has a gear train including a worm gear 121 press-fitted to the output shaft 111 of the motor 110, a worm wheel 122 engaging with the worm gear 121, and a plurality of spur gears 123, 124 and 125. The last-stage gear (output gear) 126 is provided with an output shaft 127. The drive portion 130 is accommodated in a casing 140, to which electrical contact brushes 155–157 are fixed, as will be described later.

Figure 4:
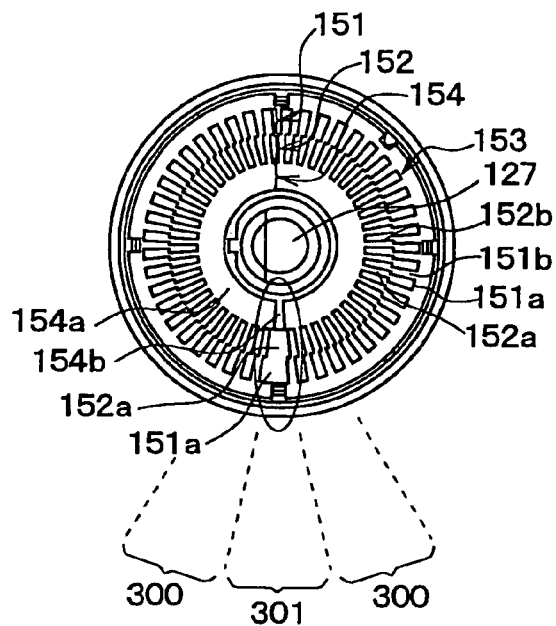
FIG. 4 is a front view showing a pattern plate of the electrical actuator according to the first embodiment.
Figure 5:
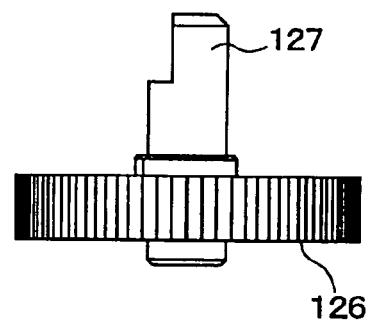
FIG. 5 is a side view showing the pattern plate of the electrical actuator according to the first embodiment.
Figure 6:
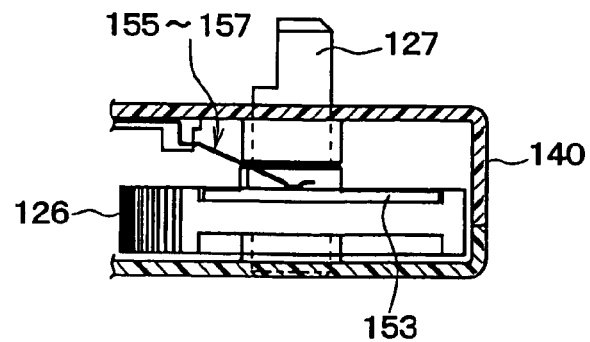
FIG. 6 is a schematic sectional view showing the electrical actuator according to the first embodiment.
Figure 8:
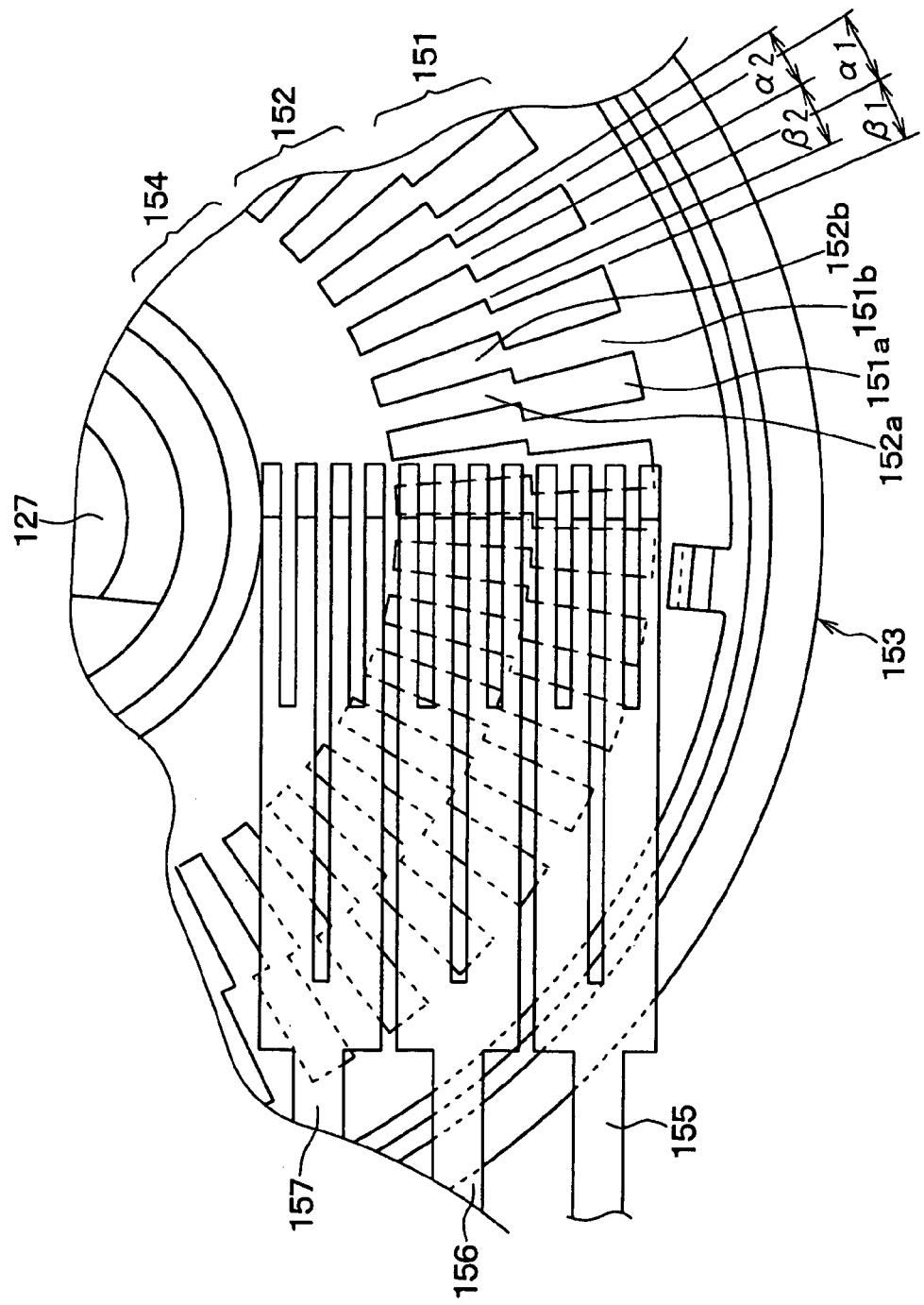
FIG. 8 is an enlarged view showing a part of the pattern plate of the electrical actuator.

On the output side of the input gear (worm gear 121) that is directly driven by the motor 110, i.e., on the side of the output shaft 127 of the reduction mechanism 120, a pulse pattern plate 153 (hereinafter "pattern plate") which rotates with the output shaft 127 is provided as shown in FIGS. 4 to 8. As shown in FIGS. 4 and 8 in detail, the pattern plate 153 includes first and second pulse patterns 151, 152 consisting of circumferentially alternating conductive portions 151a, 152a and non-conductive portions 151b, 152b, and a common pattern 154 consisting of a conductive portion 154a and a non-conductive portion 154b. The common pattern 154 is located on the inner side of the first and second pulse patterns 151, 152.

The pattern plate 153 has a circular-arc rotation-detecting region (door operation region) 300 in which the angles of circumference α1, α2, β1, β2 of the conductive and non-conductive portions 151a, 152a, 151b, 152b are all equal. The first pulse pattern 151 is offset from the second pulse pattern 152 by about half the circumferential angles α1, α2, β1, β2. The common pattern 154 consists only of the conductive portion 154a in the region 300. The door operation region 300 generates pulse signals in a certain pattern for detecting rotation angles.

The pattern plate 153 also includes a fan-shaped initialization region 301 where the first and second pulse patterns 151, 152 consist only of conductive portions 151a, 152a, respectively, and the common pattern 154 consists of the non-conductive portion 154b sandwiched between the conductive portions 154a in the circumferential direction. The initialization region 301 generates pulse signals in a certain pattern (hereinafter "initialization pattern") for indicating a starting point of the motor.

The conductive portions of the first and second pulse patterns 151, 152 are electrically connected to each other. In addition, the conductive portions 151a, 152a of the first and second pulse patterns 151, 152 are electrically connected to the conductive portion 154a of the common pattern 154 by a connecting member (not shown).

On the casing 140, the first to third electrical contact brushes 155–157 are fixed by resin molding. The first to third electrical contact brushes 155–157 are made of copper (conductive material) and are connected to the positive side of the battery. The first to third contact brushes 155–157 are in contact with the first, second, and common pulse patterns 151, 152, 154, respectively.

In this embodiment, the first to third contact brushes 155–157 are in contact with the pattern plate 153 at two points or more (four in the illustrated example) to ensure the electrical connection between the contacts and conductive portions 151a, 152a, 154a.

Next, operation of the electrical actuator 100 will be now described.

Figure 9:
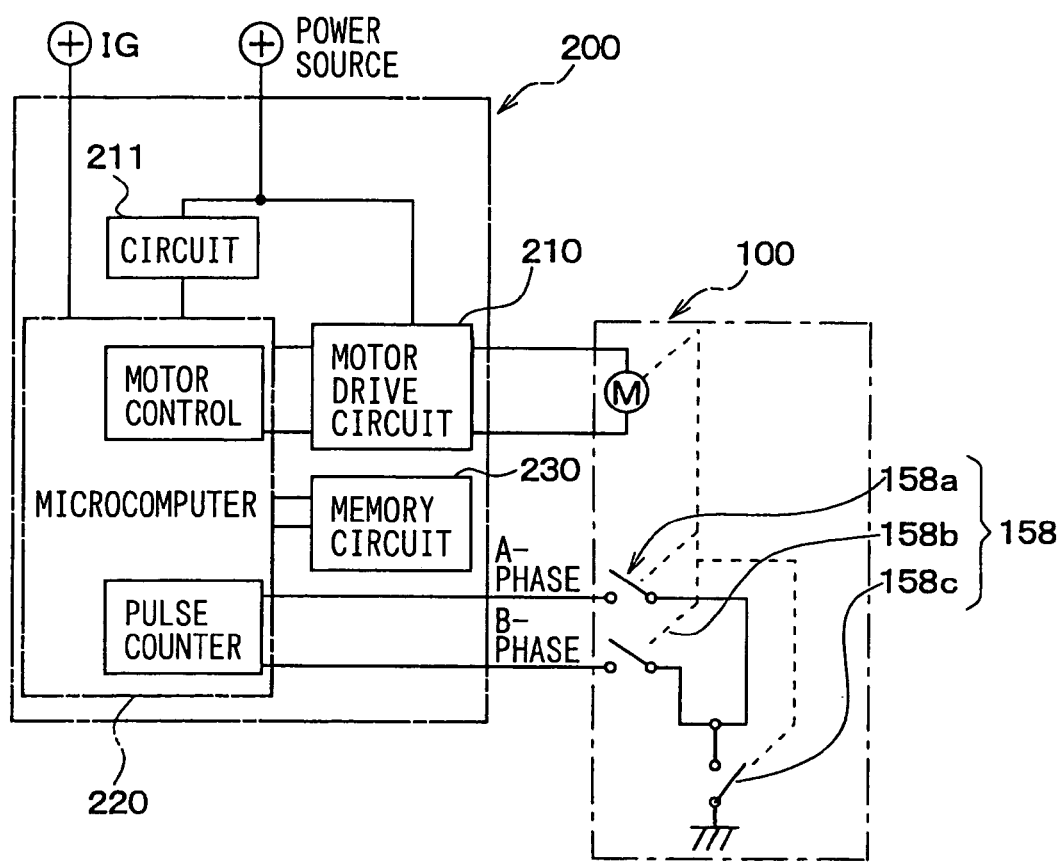
FIG. 9 is a schematic diagram showing a control circuit of the electrical actuator according to the first embodiment.

FIG. 9 is a diagram illustrating the electrical control circuit 200 of the actuator 100 serving as motor control means. The circuit 200 includes a battery-powered constant voltage circuit 211 that outputs constant voltage to other circuits, a motor drive circuit 210 for driving the motor 110, a microcomputer (rotation angle detector) 220 for detecting the rotation angle and rotation direction of the output shaft 127 based on pulse signals generated by the pattern plate 153, and a memory circuit 230 that can store and retain various input control data without a power supply, such as EEPROM.

When the output shaft 127 and the pattern plate 153 are rotated by the motor 110 and the first to third contact brushes 155–157 are in contact with the door operation region 300, the pattern plate 153 generates signals. The signals are generated in a cyclic pattern of two, ON and OFF, states, as the first and second contact brushes 155, 156 make contact with the conductive portions 151a, 152a and non-conductive portions 151b, 152b alternately, while the third contact brush 157 is in contact with the conductive portion 154a. Thus, pulse signals are generated by the first and second contact brushes 155, 156 as shown in FIG. 18 each time the motor 110 rotates a preset angle.

Figure 16:
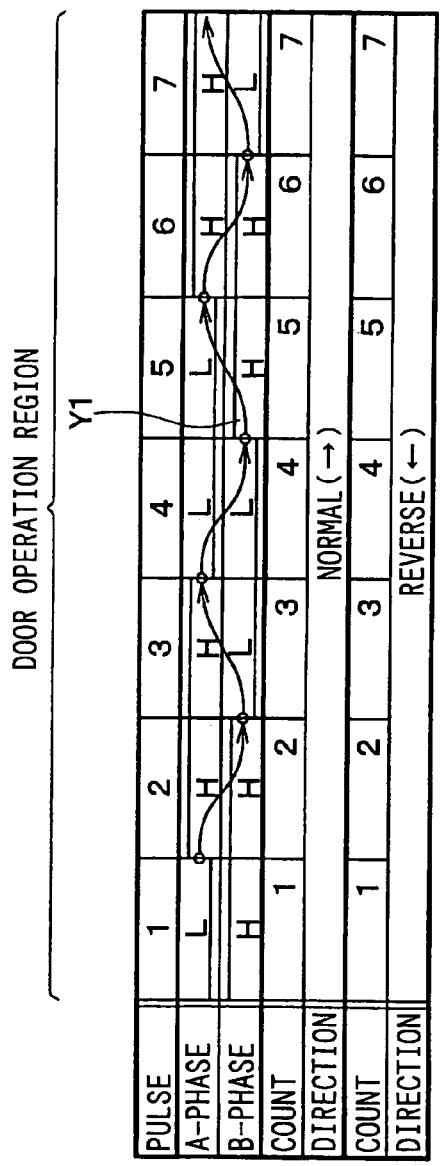
FIG. 16 is a schematic diagram showing a pulse pattern of A-phase and B-phase pulse signals in a door operation region.
Figure 17:
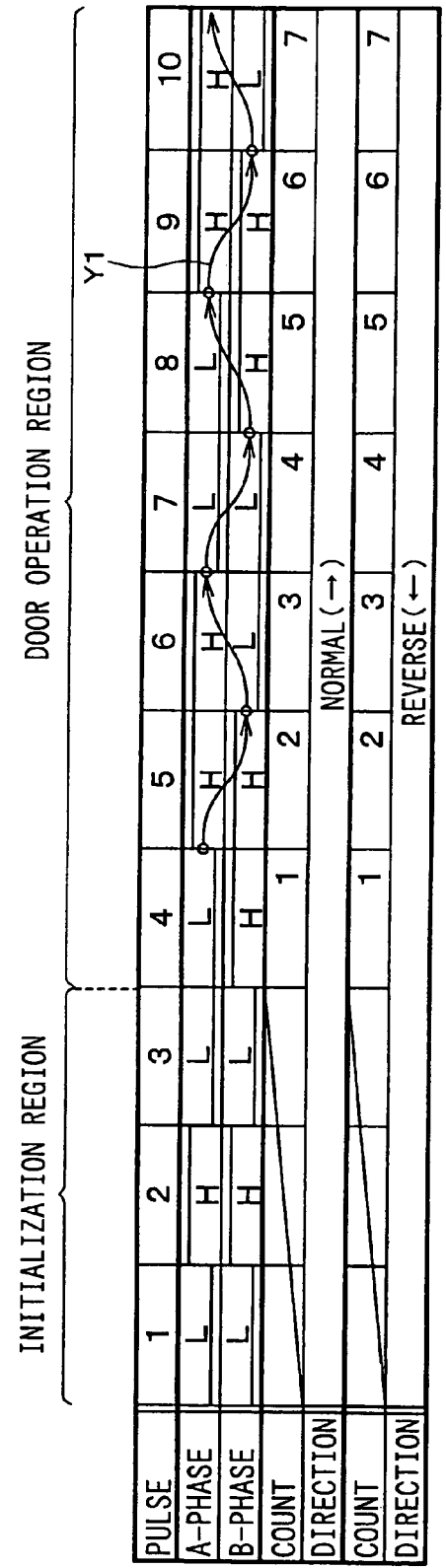
FIG. 17 is a schematic diagram showing a pulse pattern of the A-phase and B-phase pulse signals when the initialization region is provided outside the door operation region.

In FIGS. 16–19, L indicates a low level signal of A-phase pulse signal or B-phase pulse signal, and H indicates a high level signal of A-phase pulse signal or B-phase pulse signal. FIG. 16 shows a pulse signal pattern in the door operation region, FIG. 17 shows a pulse signal pattern in the door operation region and the initialization region when the initialization region is arranged at one side of the door operation region, and FIGS. 18 and 19 show pulse signal patterns in the door operation region and the initialization region when the initialization region is arranged within the door operation region.

In this embodiment, in the door operation region, the A-phase pulse signal and the B-phase pulse signal are repeated in this order of "low level, high level", "high level, high level", "high level, low level" and "low level, low level". Alternatively, in the door operating area, the A-phase pulse signal and the B-phase pulse signal are repeated in this order of "low level, low level", "high level, low level", "high level, high level" and "low level, high level". The amplitude changes of the A-phase pulse signal and the B-phase pulse signal are counted by the microcomputer 220 so that a rotation angle of the air mixing door 1 is detected in the door operation region. The microcomputer 220 counts the amplitude change of the A-phase pulse signal and the B-phase pulse signal when only one of the A-phase pulse signal and B-phase pulse signal is changed alternatively in the A-phase pulse signal and B-phase pulse signal. If both the A-phase pulse signal and B-phase pulse signal are changed at the same time, the microcomputer 220 determines the rotation shaft of the actuator is not correctly rotated. When both the A-phase pulse signal and B-phase pulse signal are changed at the same time, the microcomputer 220 determines the start point (initial position) as described in US 2004/0124797 A1, the disclosure of which is incorporated herein by reference.

The pulse patterns of the A-phase and B-phase pulse signals of the first to third contact brushes 155, 156, 157 in the door operation region 300 correspond to a first pulse pattern of the present invention.

When the first, second and third contact brushes 155–157 make contact with the initialization region 301, the third contact brush 157 makes contact with the conductive portion 154a (ON), non-conductive portion 154b (OFF), then conductive portion 154a again (ON) in succession, while the first and second contact brushes 155, 156 are in contact with the conductive portions 151a, 152a.

Thus, two-phase pulse signals (A-phase and B-phase pulse signals) are generated in accordance with the rotation angle of the motor 110 as shown in FIG. 18, which is termed here as an "initialization pattern." Unlike the pulse pattern of the door operation region, both phases of the pulse signals switch in this order of "low level, low level", "high level, high level" and "low level, low level" in the initialization region, as shown in FIG. 18, regardless of the rotation direction of the motor 110. Thus, in the initialization region, the amplitudes of the A-phase and B-phase pulse signals change in the same direction at the same time, unlike the pattern for detecting the rotation angle of the motor 110.

When the microcomputer 220 detects this initialization pattern of the A-phase and B-phase pulse signals, the motor drive circuit 210 stops power supply to the motor 110, thereby restricting the rotation of the motor 110 electrically. At the same time, the position where the A-phase and B-phase pulse signals were detected is stored as the start point (initial position). After that, the circuit 210 controls the motor 110 using the position that is offset by one pulse from the starting point as a reference point, except when the battery has been removed or there is an abnormality in the pulse signals.

Hereinafter the whole procedure of detecting the A-phase and B-phase pulse signals (initialization pattern), electrically controlling the motor 110 to stop its rotation, storing the position where the A-phase and B-phase pulse signals were detected as a starting point, and setting a position offset from this starting point as a reference point, will be termed "initial position setting."

As is clear from the above, the first to third contact brushes 155–157 and the pattern plate 153 constitute a pulse generator 158 including switching means 158a–158c (see FIG. 9), which generates pulse signals in accordance with the predetermined rotation angle of the output shaft 127.

The switching means 158a, 158b are respectively formed by contact brush 155 and first pulse pattern 151, and contact brush 156 and second pulse pattern 152. Switching means 158c is formed by the third contact brush 157, one end of which is electrically connected to ground, and common pulse pattern 154. Thereafter, the switching means 158c is turned on and off between the switching means 158a, 158b and ground as the motor 110 rotates.

In contrast, in the door operation region, by the rotation of the electrical motor 110, the output signal patterns of the A-phase and B-phase pulse signals are switched. When the output signal patterns of the A-phase pulse signal and the B-phase pulse signal are repeated in this order of "low level, high level", "high level, high level", "high level, low level" and "low level, low level", the microcomputer 220 determines that rotation of the electrical motor 10 is a positive rotation (normal rotation). When the output signal patterns of the A-phase pulse signal and the B-phase pulse signal are repeated in this order of "low level, low level", "high level, low level", "high level, high level" and "low level, high level", the microcomputer 220 determines that the rotation of the electrical motor 10 is a negative rotation (reverse rotation).

Figure 10:
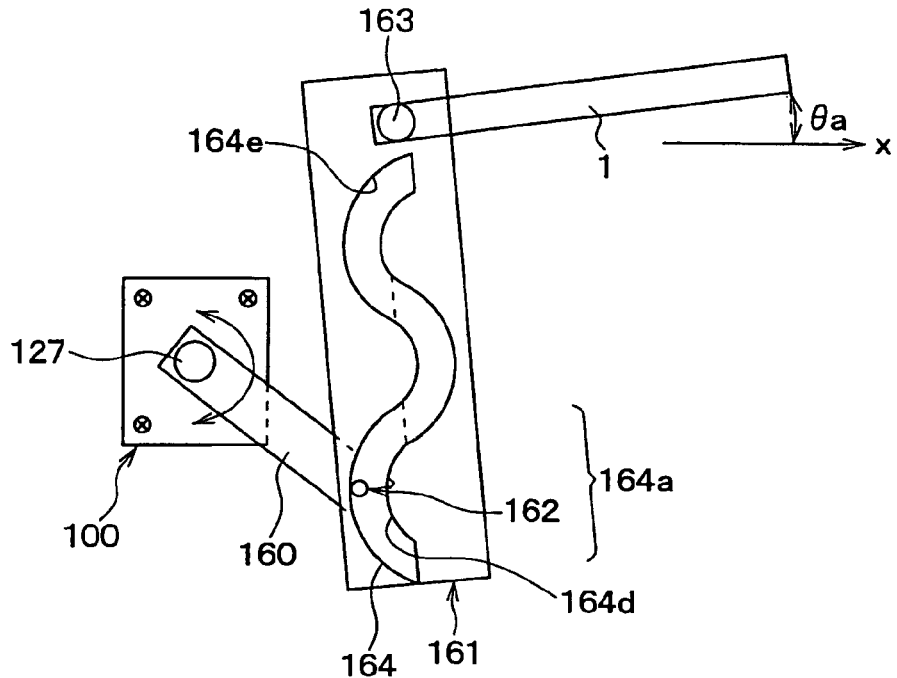
FIG. 10 is a schematic diagram showing an operation of a transmission mechanism according to the first embodiment.

Next, operation of the transmission mechanism will be now described with reference to FIGS. 10–13. First, as shown in FIG. 10, when the pin 162 of the arm member 160 is positioned in the lower groove part 164a of the groove 164, the first, second and third contact brushes 155, 156 and 157 contact the door operation region 300. Then, when the output shaft 127 of the electrical actuator 100 rotates counterclockwise, the A-phase pulse signal and the B-phase pulse signal are generated from the first and second contact brushes 155, 156, and the arm member 160 rotates counterclockwise around the output shaft 127. With this rotation of the arm member 160, the pin 162 press-contacts a right side wall 164d of the groove 164 while the pin 162 slides in the lower groove portion 164a from a middle portion in a vertical direction of the lower groove part 164a. Accordingly, the rotation force of the output shaft 127 is transferred from the pin 162 to the link plate 161, and the link plate 161 rotates clockwise around the door driving shaft 163. Therefore, the air mixing door 1 rotates clockwise around the door driving shaft 163.

Figure 11:
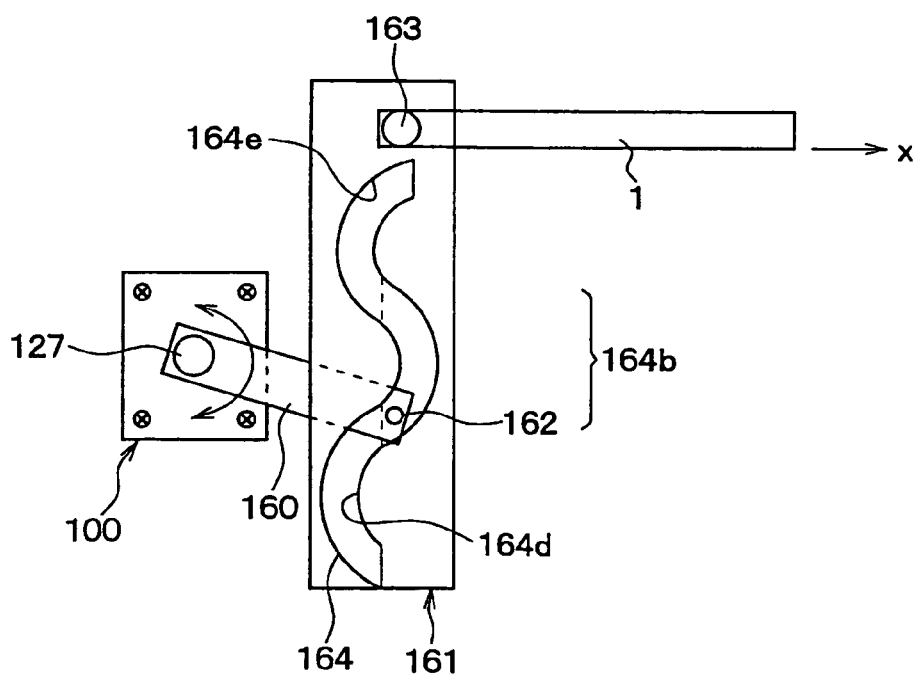
FIG. 11 is a schematic diagram showing another operation of the transmission mechanism according to the first embodiment.

Thereafter, as shown in FIG. 11, the pin 162 of the arm member 160 reaches to the middle groove part 164b of the groove 164. At this time, the first, second and third contact brushes 155, 156 and 157 reaches to the initialization region 301. Therefore, the A-phase and B-phase pulse signals in the initialization pattern start generating from the first and second contact brushes 155 and 156.

Figure 12:
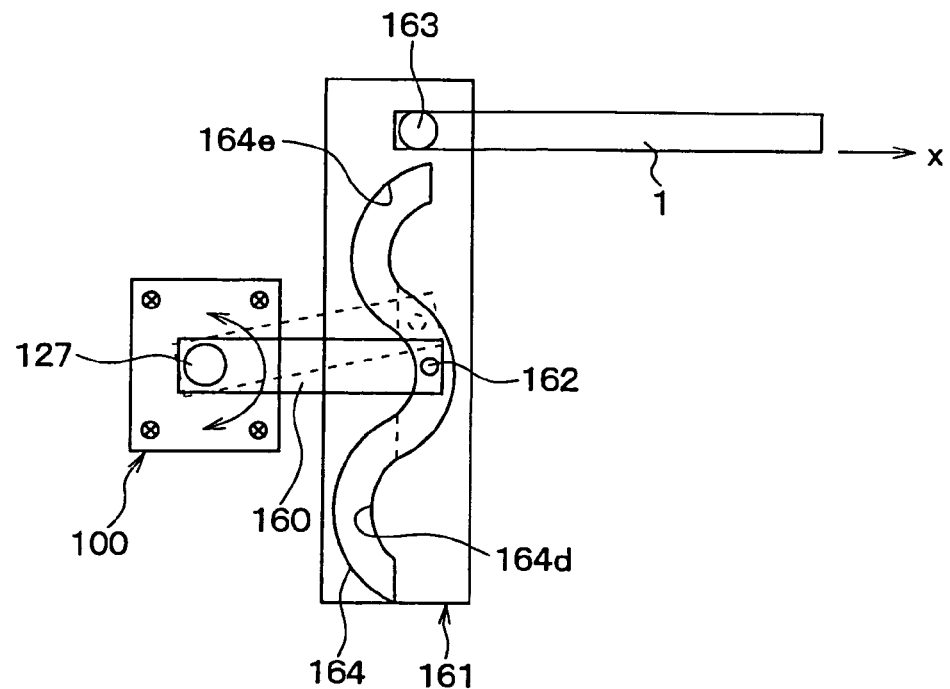
FIG. 12 is a schematic diagram showing another operation of the transmission mechanism according to the first embodiment.

The pin 162 slides in the middle groove part 164b in accordance with the counterclockwise rotation of the arm member 160 while having a clearance from each side wall 164d, 164e. Therefore, as shown in FIG. 12, even when the arm member 160 and the pin 162 rotate in the middle groove part 164b, the rotation force is not transmitted from the pin 162 to the link plate 161 and the air mixing door 1. Accordingly, when the A-phase and B-phase pulse signals in the initialization region are generated from the first and second contact brushes 155 and 156, the rotation of the air mixing door 1 is stopped.

Figure 13:
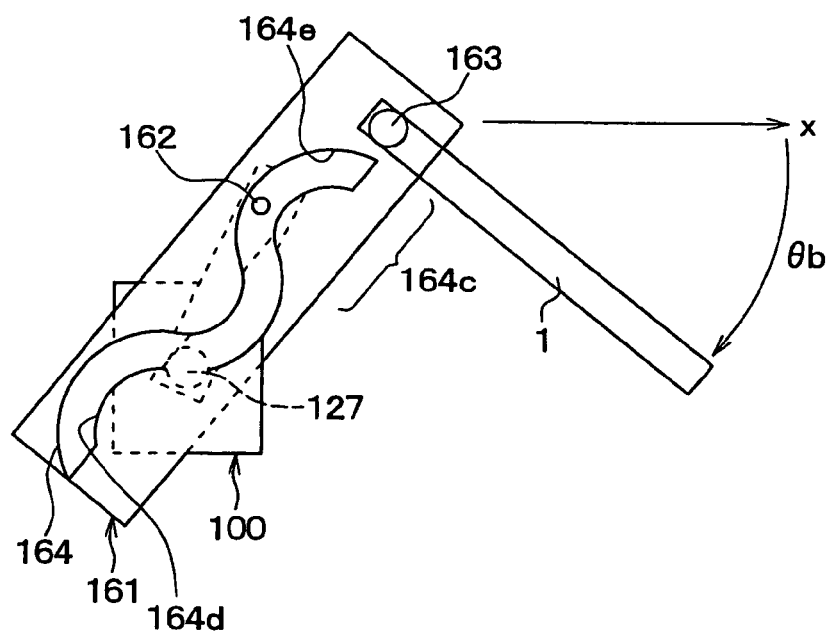
FIG. 13 a schematic diagram showing another operation of the transmission mechanism according to the first embodiment.

Thereafter, as shown in FIG. 13, when the pin 162 of the arm member 160 reaches the upper groove part 164c of the groove 164, the first, second and third brushes 155, 156 and 157 reach again to the door operation region 300. Accordingly, the A-phase and B-phase pulse signals in the door operation region 300 start generating from the first and second contact brushes 155 and 156.

In accordance with the counterclockwise rotation of the arm member 160 in the upper groove part 164c, the pin 162 press-contacts the left side wall 164e while the pin 162 slides in the upper groove part 164c from a lower end of the upper groove part 164c. Thus, the rotation force of the output shaft 127 is transmitted from the pin 162 to the link plate 161, and the link plate 161 starts clockwise rotating around the door driving shaft 163. Therefore, the air mixing door 1 rotates clockwise around the door driving shaft 163.

As described above, when the first and second contact brushes 155, 156 contact the door operation region 300, the rotation force of the electrical actuator 100 is transmitted to the air mixing door 1. In contract, when the first and second contact brushes 155, 156 contact the initialization region 301, the rotation force of the electrical actuator 100 is not transmitted to the air mixing door 1.

Figure 14:
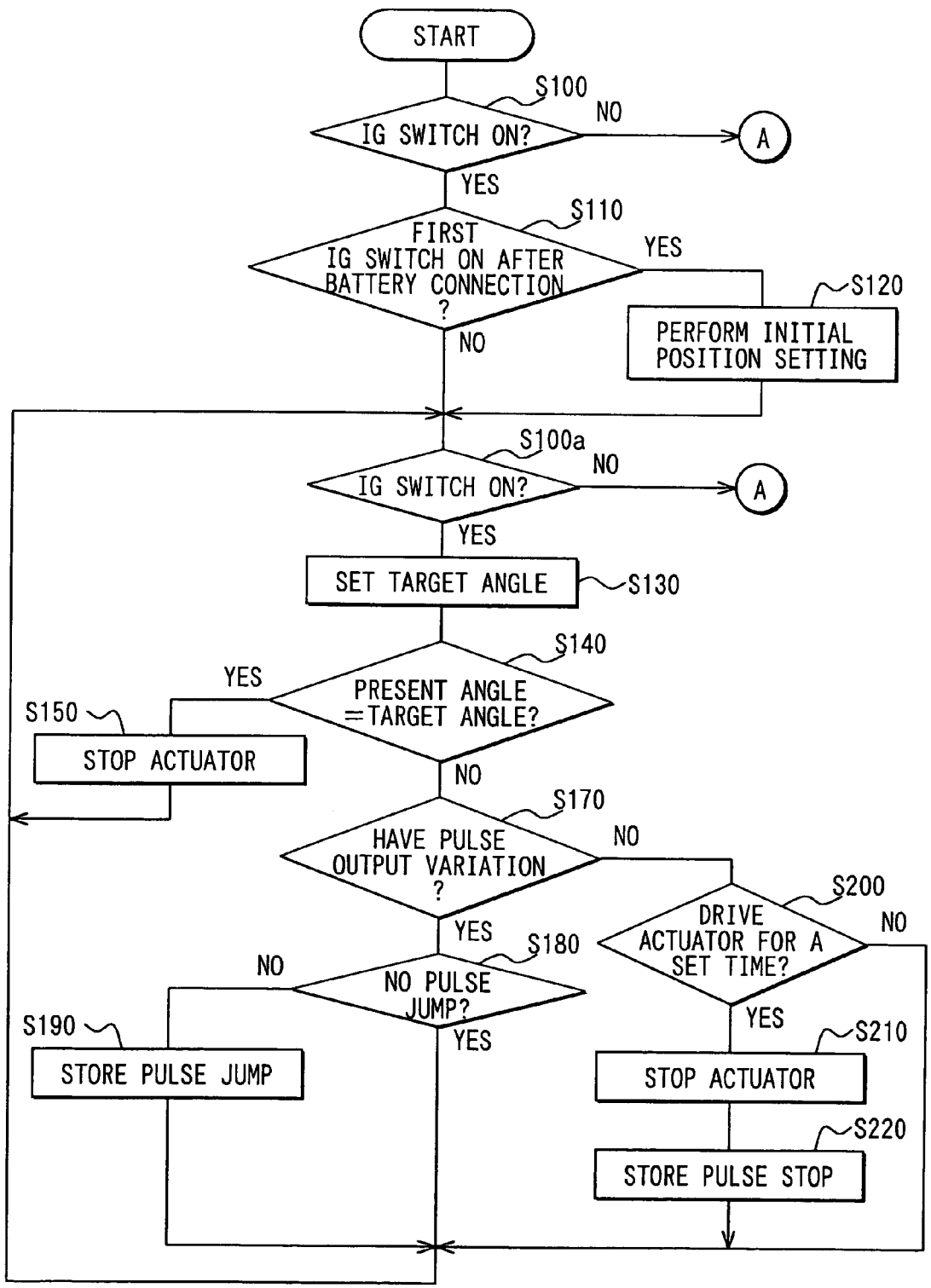
FIG. 14 is a flow diagram showing a part of a control process of the electrical actuator according to the first embodiment.
Figure 15:
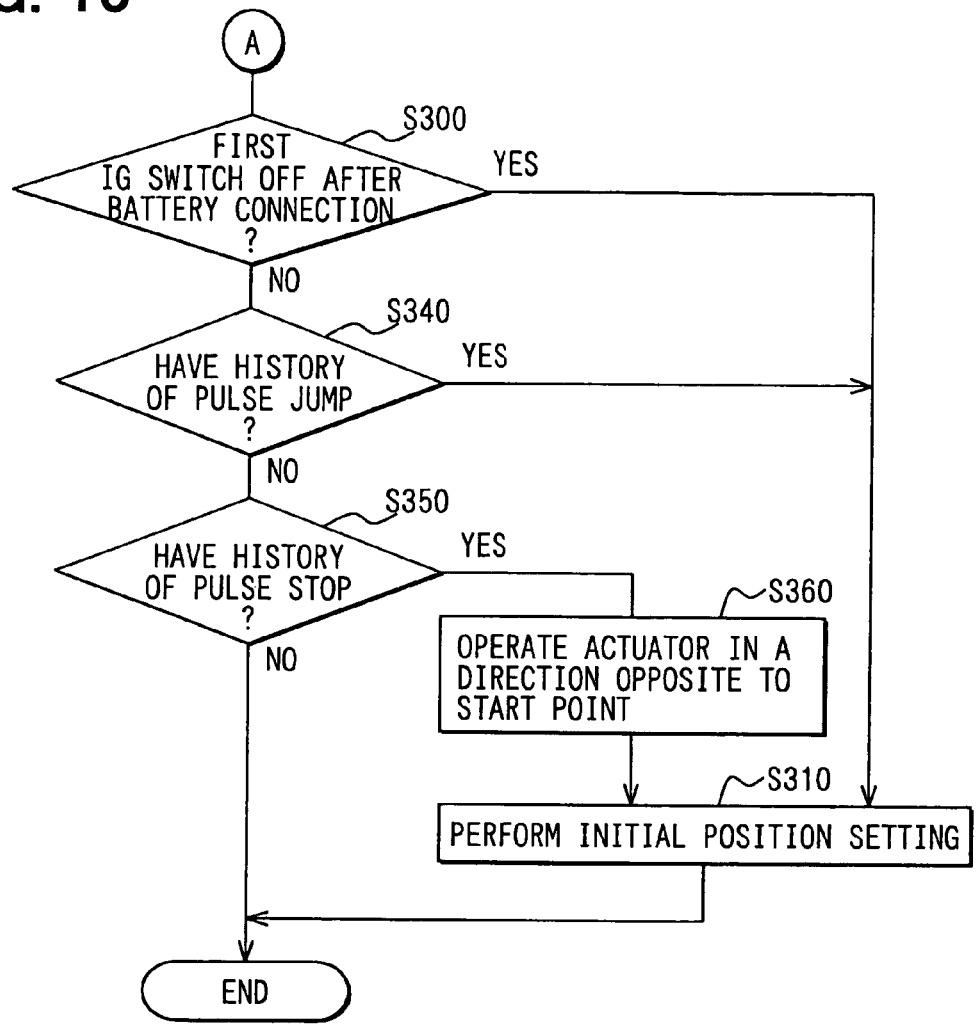
FIG. 15 is a flow diagram showing the other part of the control process of the electrical actuator according to the first embodiment.

Next, control process of the electrical actuator 100, that is, control process of the DC motor 110 will be now described with reference to FIGS. 14 and 15. FIGS. 14 and 15 show the control process performed by the microcomputer 220 of the electrical control circuit 200. The microcomputer 220 performs and repeats the control program shown in FIGS. 14 and 15.

When the ignition switch (IG switch) of the vehicle is turned on at step S100, the microcomputer 220 determines whether the ignition switch is turned on for the first time after the battery is connected, based on a flag stored in the memory circuit 230, at step S110. As the flag, date for indicating a history of whether or not the battery is disengaged is used. When it is determined that there is the history with the disengaged battery, and when it is determined that the ignition switch is turned on for the first time after the battery is connected, the initial position setting is performed at step S120.

Thereafter, when the ON state of the ignition switch is determined again at step S100a, the microcomputer 220 controls the motor 110 so that the air mixing door 1 becomes the target rotation angle, at steps S130, S140, S150. Specifically, a target temperature of air to be blown into the passenger compartment is calculated based on an inside air temperature of the passenger compartment, an outside air temperature, a sunlight amount entering into the passenger compartment, and a set temperature. Then, a target opening degree of the air mixing door 1, that is, the target rotation angle of the air mixing door 1 is calculated, and the electrical power supply to the electrical motor 110 is continued until the actual rotation angle (present rotation angle) of the air mixing door 1 becomes the target rotation angle.

Even when the initialization pattern of the A-phase and B-phase pulse signals is detected before the actual rotation angle becomes the target rotation angle, the electrical power supply to the electrical motor 110 is continued, and the rotation of the electrical motor 110 is continued.

The target rotation angle and the present rotation angle are respectively indicated by count values of amplitude variations caused alternatively in the A-phase and B-phase pulse signals only at one side. When the count value indicating the target rotation angle corresponds to the count value indicating the present rotation angle, the electrical power supply to the electrical motor 110 is stopped, and the air mixing door 1 is stopped at the target rotation angle.

When the ignition switch is not turned on for the first time after the battery is connected at step S110, that is, when the ignition switch is tuned on by two times or more after the battery is connected, the microcomputer 220 controls the motor 110 so that the air mixing door 1 is rotated to the target rotation angle at step S130, S140, S150.

Further, in a case where the motor 110 is controlled so that the air mixing door 1 is rotated to the target rotation angle (step S130, S140, S150) , that is, in a case where the drive current is supplied to the motor 110, when the variation of the pulse signals is stopped, there is a high probability of an abnormal generation of the pulse signals.

In this embodiment, at step S170, it is determined whether or not there is a variation in the pulse output. When there is no variation in the pulse output at step S170, it is determined whether the electrical actuator 100 drives for a predetermined time at step S200. When the variation in the pulse signal is stopped after a predetermined time passes after the drive current is supplied to the electrical actuator 100, it is determined that the pulse signals have an abnormal generation at step S200. In this case, the drive current to be supplied is stopped, and the operation of the electrical actuator 100 is stopped at step S210. Then, at step S220, information that the variation in the pulse signals is stopped is stored in the memory circuit 230.

In contrast, when the pulse signals change while the drive current is supplied to the motor 110 at step S170, it is determined whether or not an abnormal pulse change such as a pulse jump is generated at step S180. That is, at step S180, it is determined whether the pulse signal is regularly generated without generating a disturbed pulse wave. When the pulse jump is not generated at step S180, the control program returns to step S100a. When the abnormal pulse change such as the pulse jump is generated at step S180, the information where the abnormal pulse change such as the pulse jump is generated is stored in the memory circuit 230 at step S190, and the control program returns to step S100a.

When the motor 110 is controlled while the abnormal pulse change such as the pulse jump is generated, the actual position (actual opening degree) of the air mixing door 1 may be different from the target position (target opening degree). In this case, the initial position setting is performed after the ignition switch is shut.

Furthermore, in the case where the ignition switch is shut, when the ignition switch is turned off for the first time after the battery is connected at step S300, the initial position setting is performed at step S310. In contrast, even in the case where the ignition switch is shut, when the shutting of the ignition switch is not the first shutting after the battery is connected at step S300, it is determined whether a history of the abnormal pulse change such as the pulse jump exists based on information stored in the memory circuit 230 at step S340. When there is the history of the pulse jump while the motor 110 is driven, the initial position setting is performed at step S310.

When the abnormal pulse change such as the pulse jump does not generate at step S340, it is determined whether or not there is a pulse signal stop history based on information stored in the memory circuit 230 at step S350. When there is the pulse signal stop history at step S350, the drive current is supplied so that the motor 110 is rotated in a direction opposite to the rotation direction of the motor 110 at a time immediately before the pulse signal change is stopped, at step S360. Thereafter, at step S310, the initial position setting is performed.

According to the embodiment of the present invention, when the first and second brushes 155, 156 generate, respectively, the A-phase and B-phase pulse signals in the door operation region of the pattern plate 153, the transmission mechanism transmits the rotation force of the electrical motor 110 (i.e., rotation force of the output shaft 127) to the air mixing door 1. Furthermore, when the first and second brushes 155, 156 generate, respectively, the A-phase and B-phase pulse signals in the initialization region of the pattern plate 153, the transmission mechanism stops the transmission of the rotation force from the electrical motor 110 (i.e., rotation force of the output shaft 127) to the air mixing door 1.

Thus, when the first and second brushes 155, 156 generate the A-phase and B-phase pulse signals in the door operation region, the air mixing door 1 is rotated. In contrast, when the first and second brushes 155, 156 generate the A-phase and B-phase pulse signals in the initialization region, the operation (rotation) of the air mixing door 1 is stopped. Accordingly, when the first and second brushes 155, 156 generate the A-phase and B-phase pulse signals in the initialization region, the detected position of the air mixing door 1 is the same position regardless of the rotation direction of the electrical motor 110. Therefore, even when the initialization region is arranged at a middle position of the door operation region, it can prevent the detection accuracy of the rotation angle of the air mixing door 1 from deteriorating.

In this embodiment, the initialization region can be set at an outside of the door operation region as shown in FIG. 17. However, in this case, 10 pulse parts are required for both the door operation region and the initialization region, as shown in FIG. 17.

In contrast, when the initialization region is arranged in a middle position within the door operation region, the initialization region can be set by using the fourth pulse part (4 pulse part) of "low level, low level", as shown in FIG. 18. In this case, both the door operation region and the initialization region can be set by using 9 pulse parts. Accordingly, the size of the pattern plate 153 can be reduced in the arrangement of initialization region. In this case, at different positions in the normal rotation and reverse rotation of the electrical motor 110, the same count 4 is detected, and the count 4 is not changed in the initialization region. However, in this embodiment, when the A-phase and B-phase pulse signals are generated in the door operation region, the transmission mechanism transmits the rotation force of the electrical motor 110 to the air mixing door 1, thereby rotating the air mixing door 1. In contrast, when the A-phase and B-phase pulse signals are generated in the initialization region, the transmission mechanism stops the transmission of the rotation force of the electrical motor 110 to the air mixing door 1, thereby stopping the movement of the air mixing door 1. Accordingly, when the A-phase and B-phase pulse signals are generated in the initialization region, the same position of the air mixing door 1 is detected as the detection position regardless of the rotation direction of the electrical motor. As a result, even when the initialization region is arranged at a middle position of the door operation region, the moving position of the air mixing door 1 can be accurately detected.

In this embodiment, as the initialization pattern of the pulse signals, the pattern where the amplitudes of the A-phase and B-phase pulse signals change at the same time by two times or more is used. Generally, even when the amplitudes of the pulse signals are disturbed due to electromagnetic noise, it is unusual for both the A-phase and B-phase pulse signals to be switched at the same time in this order of the low level signal, the high-level signal and the low-level signal. Accordingly, by using the initialization pattern where the amplitudes of the A-phase and B-phase pulse signals change at the same time by two times or more, it can prevent the initial pattern from being incorrectly detected.

Alternatively, the pattern of the pulse signals can be set as shown in FIG. 19. That is, in the initialization pattern, the amplitudes of the A-phase and B-phase signals change at the same time by one time. In this case, the size of the pattern plate 153 can be further reduced.

In the first embodiment, the rotation angle of the air mixing door 1 is accurately detected, because a difference in the detected rotation angle at the same position of the air mixing door 1 can be effectively restricted. Accordingly, temperature of air to be blown into the passenger compartment can be accurately adjusted by the air mixing door 1.

(Second Embodiment)

Figure 20:
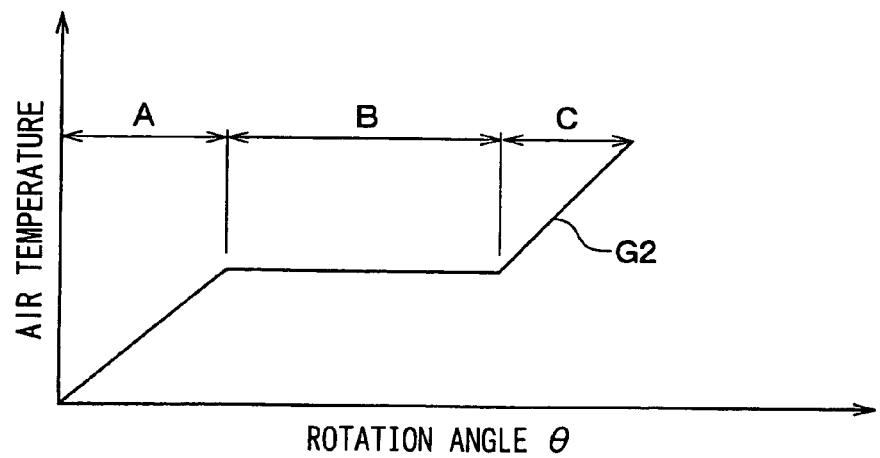
FIG. 20 is a graph showing a relationship between a rotation angle and a temperature of air to be blown into a passenger compartment, according to a second embodiment of the present invention.

The second embodiment of the present invention will be now described with reference to FIGS. 20–22B. FIG. 20 is a characteristic view showing the relationship between the rotation angle ω of the output shaft 127 of the electrical actuator 100 and the air temperature to be blown into the passenger compartment.

As shown in FIG. 20, when the first, second and third contact brushes 155, 156 and 157 are positioned in the initialization region 301, the temperature of air to be blown is not changed in accordance with a change of the rotation angle ω of the output shaft 127, as shown by the horizontal line range B of FIG. 20. Accordingly, in the range B of FIG. 20, even when the detected rotation angles of the air mixing door 1 are different from each other, it can prevent the accuracy in the air temperature adjustment from deteriorating.

Figure 21A:
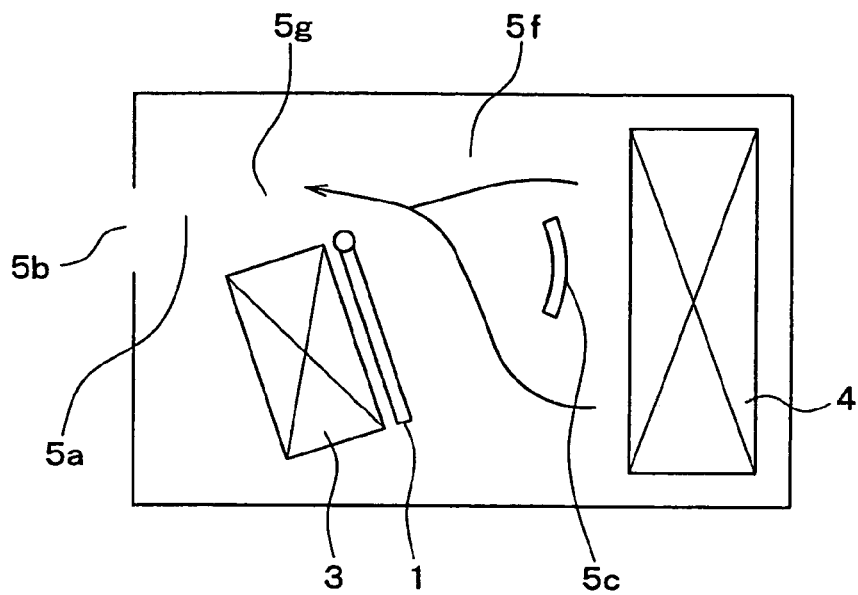
FIGS. 21A and 21B are schematic diagrams showing functions of a shield wall according to the second embodiment.

Specifically, in the second embodiment, as shown in FIG. 21A, a shield wall 5c is provided in the air conditioning case 5, so that the temperature of the blown air can be set at a constant temperature even when the rotation angle ω is changed while the first, second and third contact brushes 155, 156, 157 are positioned in the initialization region.

The ranges shown by A and C of FIG. 20 correspond to the door operation regions.

The shield wall 5c will be now described with reference to FIGS. 21A, 21B, 22A and 22B. FIGS. 21A, 21B, 22A and 22B are schematic diagrams showing arrangement relationships between the shield wall 5c, the air mixing door 1 and the evaporator 4. The shield wall 5c is formed between the air mixing door 1 and the evaporator 4 to extend from a right side inner wall to a left side inner wall in the air conditioning case 5.

Figure 21B:
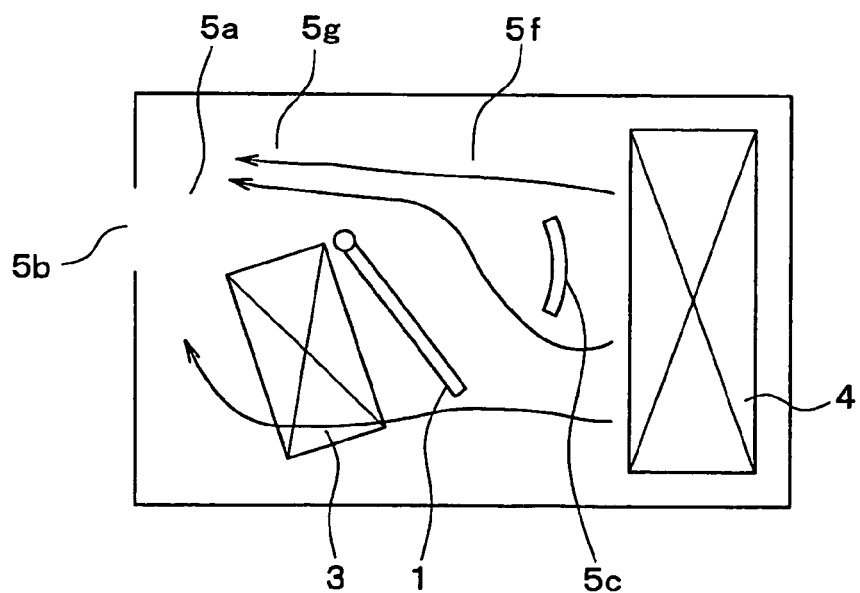
Figure 22A:
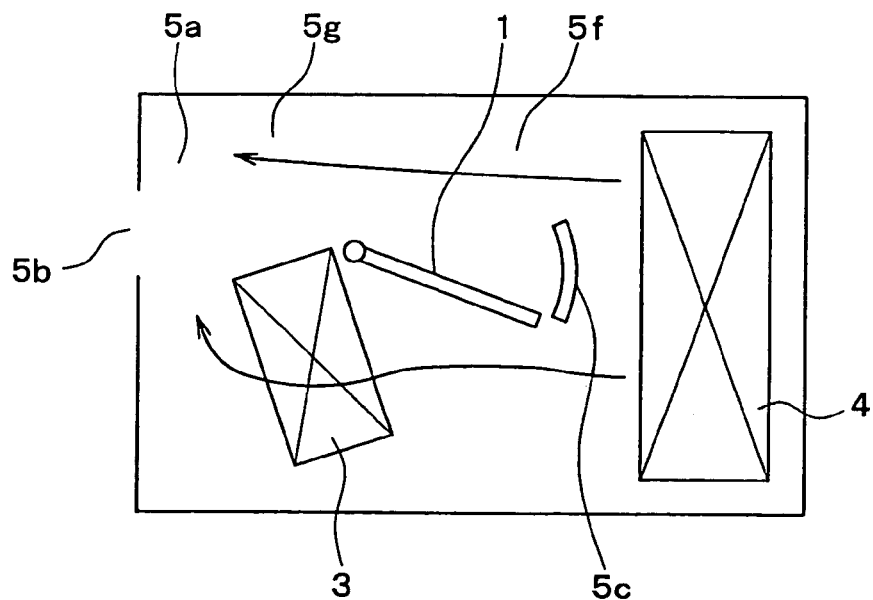
FIGS. 22A and 22B are schematic diagrams showing functions of the shield wall according to the second embodiment.
Figure 22B:
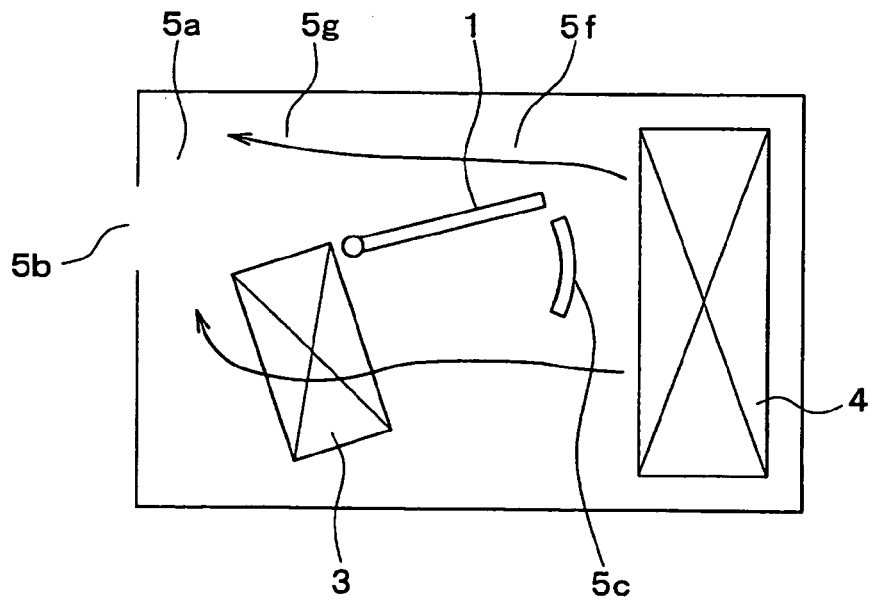

When the air mixing door 1 is rotated from the state of FIG. 21A where the heater core 3 is closed by the air mixing door 1 to the state of FIG. 21B so that the opening degree of the air mixing door 1 becomes gradually large, the first, second and third contact brushes 155, 156 and 157 are positioned in the door operation region. In this case, the cool air blown from the evaporator 4 directly flows to the air mixing door 1, and the air mixing door 1 has the temperature adjustment function. Here, the temperature of air to be blown into the passenger compartment has a relationship with the rotation angle ω of the output shaft 127, as shown by the range A in FIG. 20. Therefore, the temperature of air to be blown into the passenger compartment becomes higher as the rotation angle ω of the output shaft 127 becomes larger.

Thereafter, when the first, second and third contact brushes 15, 156 and 157 reaches to the initialization region 301, the air mixing door 1 is positioned at a direct downstream air side of the shield wall 5c, so that cool air blown from the evaporator 4 does not reach directly to the air mixing door 1. Accordingly, even when the opening degree of the air mixing door 1 changes in a shield area where the cool air blown from the evaporator 4 does not reach directly to the air mixing door 1, the ratio between the air amount passing through the bypass passage 5g from the evaporator 4 and the air amount passing through the heater core 3 from the evaporator 4 becomes substantially constant, thereby the temperature of air to be blown into the passenger compartment also becomes substantially constant.

Thereafter, when the air mixing door 1 moves above the top end of the shield wall 5c, the first, second and third contact brushes 155, 156 and 157 reach again to the door operation region. Therefore, the cool air blown from the evaporator 4 reaches directly to the air mixing door 1, and the air mixing door 1 has again the temperature adjustment function. Here, the temperature of air to be blown into the passenger compartment has a relationship with the rotation angle ω of the output shaft 127, as shown by the range C in FIG. 20. Therefore, the temperature of air to be blown into the passenger compartment becomes higher as the rotation angle ω of the output shaft 127 becomes larger.

According to the second embodiment, even when the first and second brushes 155, 156 generate respectively the A-phase and B-phase pulse signals, the shield wall 5c shuts an air flow directly toward the air mixing door 1 from the evaporator 4 in the air passage 5f of the air conditioning case 5 while the air mixing door 1 is positioned in the shield area.

Accordingly, even when the first and second brushes 155, 156 generate the A-phase and B-phase pulse signals in the initialization region of the pattern plate 153, the air mixing door 1 does not change the flow ratio between the air amount passing through the bypass passage 5g and the air amount passing through the heater core 3 in the shield area. Thus, even when the detection angles of the air mixing door 1 are different from each other in the shield area, it can prevent the temperature adjustment accuracy of air to be blown from deteriorating.

(Other Embodiments)

Although the present invention has been fully described in connection with the preferred embodiments thereof with reference to the accompanying drawings, it is to be noted that various changes and modifications will become apparent to those skilled in the art.

For example, in the above-described embodiments, the pattern plate 153 is constructed such that the two kinds of A-phase and B-phase pulse signals are generated as first and second pulse signals. However, the pattern plate 153 can be constructed so that three or more kinds of pulse signals can be generated.

In the above-described embodiments, as the initialization pattern, the amplitudes of the A-phase and B-phase pulse signals are changed in this order of "low level, low level", "high level, high level" and "low level, low level". However, as the initialization pattern, the amplitudes of the A-phase and B-phase pulse signals can be changed in this order of "high level, high level", "low level, low level" and "high level, high level".

In the above-described embodiments, the present invention is typically applied to the air mixing door 1 that is rotatably supported as a movable member. However, the present invention can be applied to a slidable member such as a slidable door as the movable member. Further, in the present invention, a mode switching door for switching an air outlet mode or a valve for adjusting a flow amount can be used as the movable member, instead of the air mixing door 1.

In the above-described embodiments, a slidable rotation angle detector constructed with the pattern plate 153 and the first, second and third brushes 155, 156 and 157 are used for the electrical actuator. However, an optical rotation angle detector can be used for the electrical actuator.

Furthermore, in the above-described first embodiment, the rotatable plate door is used as the air mixing door 1; however, a slidable member such as a slidable door can be used as the air mixing door 1. In this case, the microcomputer 220 (position detector) detects a sliding position of the slidable door based on the A-phase and B-phase pulse signals, instead of the rotation angle of the air mixing door 1.

In the above-described second embodiment, by using the shield wall 5c, the temperature of air is made substantially constant in the range B of FIG. 20 even when the rotation angle ., opening degree of the air mixing door) is changed. However, only when a variation in the air temperature relative to the rotation angle ., can be restricted, the other member (other means) except for the shield wall 5c can be used.

Generally, a pressure loss in the air passage from the bypass passage 5g to the mixing chamber 5a is smaller than a pressure loss in the air passage from the heater core 3 to the mixing chamber 5a. Accordingly, when the high pressure loss in the air passage is larger, a variation in the air flow ratio between air flowing to the bypass passage and air flowing to the heater core 3 can be restricted relative the rotation angle ...

In the above-described embodiments, the electrical actuator of the present invention is typically applied to a vehicle air conditioner. However, the actuator of the present invention can be applied to various industry equipments and other devices.

Such changes and modifications are to be understood as being within the scope of the present invention as defined by the appended claims.

What is claimed is:

1. An electrical actuator system comprising:
    an electrical motor;
    a movable member supported to be movable;
    a transmission mechanism which transmits a rotational force of the electrical motor to the movable member;
    a rotation member which rotates in accordance with rotation of the electrical motor;
    a pulse generator for generating first and second pulse signals in accordance with rotation of the rotation member, wherein the pulse generator generates the first and second pulse signals by a first pulse pattern in an operation region of the rotation member and by a second pulse pattern different from the first pulse pattern in an initialization region of the rotation member, and the initialization region is separate from the operation region;
    a moving position detector which detects a position of the movable member based on the first and second pulse signals generated from the pulse generator in the operation region;
    an initial position detector which detects a start point of the movable member based on the first and second pulse signals generated from the pulse generator in the initialization region;
    a controller which controls the electrical motor to displace the movable member to a target position, based on the position detected by the moving position detector with respect to the start point detected by the initial position detector, wherein:
    when the pulse generator generates the first and second pulse signals in the operation region, the transmission mechanism transmits the rotation force of the electrical motor to the movable member; and
    when the pulse generator generates the first and second pulse signals in the initialization region, the transmission mechanism stops the transmission of the rotation force of the electrical motor to the movable member.

2. The electrical actuator system according to claim 1, wherein:
    the transmission mechanism includes
        an arm member rotating with the rotation of the electrical motor, the arm member having a protrusion portion, and
        a plate member supported to be rotatable, the plate member having a groove in which the protrusion portion is inserted to be slidable in accordance with rotation of the arm member;
    the movable member rotates integrally with rotation of the plate member;
    when the pulse generator generates the first and second pulse signals in the operation region, the protrusion portion press-contacts a side wall portion of the groove while the protrusion portion slides in the groove, to transmit the rotation force of the electrical motor to the plate member; and
    when the pulse generator generates the first and second pulse signals in the initialization region, the protrusion portion slides in the groove to have a clearance with the side wall portion of the groove while the protrusion portion slides in the groove, to stop transmission of the rotation force of the electrical motor to the plate member.

3. The electrical actuator system according to claim 2, wherein:
    the groove has first, second and third groove parts provided continuously;
    the second groove part is positioned between the first and third groove parts;
    the protrusion portion press-contacts the aide wall portion of the groove in the first and third groove parts; and
    the protrusion portion slides in the second groove part without press-contacting the side wall portion of the groove.

4. The electrical actuator system according to claim 3, wherein each of the first, second and third groove pails approximately has a C shape.

5. The electrical actuator system according to claim 3, wherein the second groove part has a circular arc shape having the same center as a rotation axis of the arm member.

6. The electrical actuator system according to claim 1, wherein:
    in the first pulse pattern, the first and second pulse signals generate amplitude variation only at one side pulse signal alternatively in the first and second pulse signals;
    the moving position detector counts the amplitude variation generated only at one side pulse signal alternatively in the first and second pulse signals;
    in the second pulse pattern, the amplitudes of the first and second pulse signals generated from the pulse generator in the initialization region change in the same direction at the same time; and
    the initial position detector detects the start point of the movable member by detecting an amplitude change generated at the same time in the first and second pulse signals.

7. The electrical actuator system according to claim 6, wherein the initial position detector detects the start point of the movable member by detecting two times or more the amplitude change generated at the same time in the first and second pulse signals.

8. The electrical actuator system according to claim 1, wherein the movable member is a door member for adjusting an air conditioning state of a vehicle compartment in accordance with a displacement position.

9. An air conditioner for a vehicle, comprising:
an air conditioning case for defining an air passage through which air flows toward a passenger compartment of the vehicle;
a heat exchanger for heating air, the heat exchanger being disposed in the air conditioning case at one side to form a bypass passage through which air flows while bypassing the heat exchanger;
a temperature adjustment door which adjusts temperature of air to be blown into the passenger compartment by adjusting a flow ratio between an air amount passing through the heat exchanger and an air amount passing through the bypass passage in accordance with a door opening degree;
an electrical motor for moving the temperature adjustment door;
a transmission mechanism which transmits a rotational force of the electrical motor to the temperature adjustment door;
a rotation member which rotates in accordance with a rotation force of the electrical motor;
a pulse generator for generating first and second pulse signals in accordance with rotation of the rotation member, wherein the pulse generator generates the first and second pulse signals by a first pulse pattern in an operation region of the rotation member and by a second pulse pattern different from the first pulse pattern in an initialization region of the rotation member, and the initialization region is separate from the operation region;
a moving position detector which detects a position of the temperature adjustment door based on the first and second pulse signals generated from the pulse generator in the operation region;
an initial position detector which detects a start point of the temperature adjustment door based on the first and second pulse signals generated from the pulse generator in the initialization region;
a controller which controls the electrical motor to displace the temperature adjustment door to a target position, based on the position detected by the position detector with respect to the start point detected by the initial detector; and
a change restriction means for restricting a variation in the flow ratio relative to the door opening degree, when the pulse generator generates the first and second pulse signals in the initialization region.

10. The air conditioner according to claim 9, wherein the change restriction means is a shield wall member disposed in the air conditioning case to shield a direct air flow toward the temperature adjustment door when the first and second pulse signals are generated from the pulse generator in the initialization region.

11. An air conditioner for a vehicle, comprising:
an air conditioning case for defining an air passage through which air flows toward a passenger compartment of the vehicle;
a heat exchanger for heating air, the heat exchanger being disposed in the air conditioning case at one side to form a bypass passage through which air flows while bypassing the heat exchanger;
a temperature adjustment door which adjusts temperature of air to be blown into the passenger compartment by adjusting a flow ratio between an air amount passing through the heat exchanger and an air amount passing through the bypass passage in accordance with a door opening degree;
an electrical motor for moving the temperature adjustment door;
a transmission mechanism which transmits a rotational force of the electrical motor to the temperature adjustment door;
a rotation member which rotates in accordance with a rotation force of the electrical motor;
a pulse generator for generating first and second pulse signals in accordance with rotation of the rotation member, wherein the pulse generator generates the first and second pulse signals by a first pulse pattern in an operation region of the rotation member and by a second pulse pattern different from the first pulse pattern in an initialization region of the rotation member, and the initialization region is separate from the operation region;
a moving position detector which detects a position of the temperature adjustment door based on the first and second pulse signals generated from the pulse generator in the operation region;
an initial position detector which detects a start point of the temperature adjustment door based on the first and second pulse signals generated from the pulse generator in the initialization region;
a controller which controls the electrical motor to displace the temperature adjustment door to a target position, based on the position detected by the moving position detector with respect to the start point detected by the initial position detector, wherein:
when the pulse generator generates the first and second pulse signals in the operation region, the transmission mechanism transmits the rotation force of the electrical motor to the temperature adjustment door; and
when the pulse generator generates the first and second pulse signals in the initialization region, the transmission mechanism stops the transmission of the rotation force of the electrical motor to the temperature adjustment door.

* * * * *